United States Patent Office 3,216,865
Patented Nov. 9, 1965

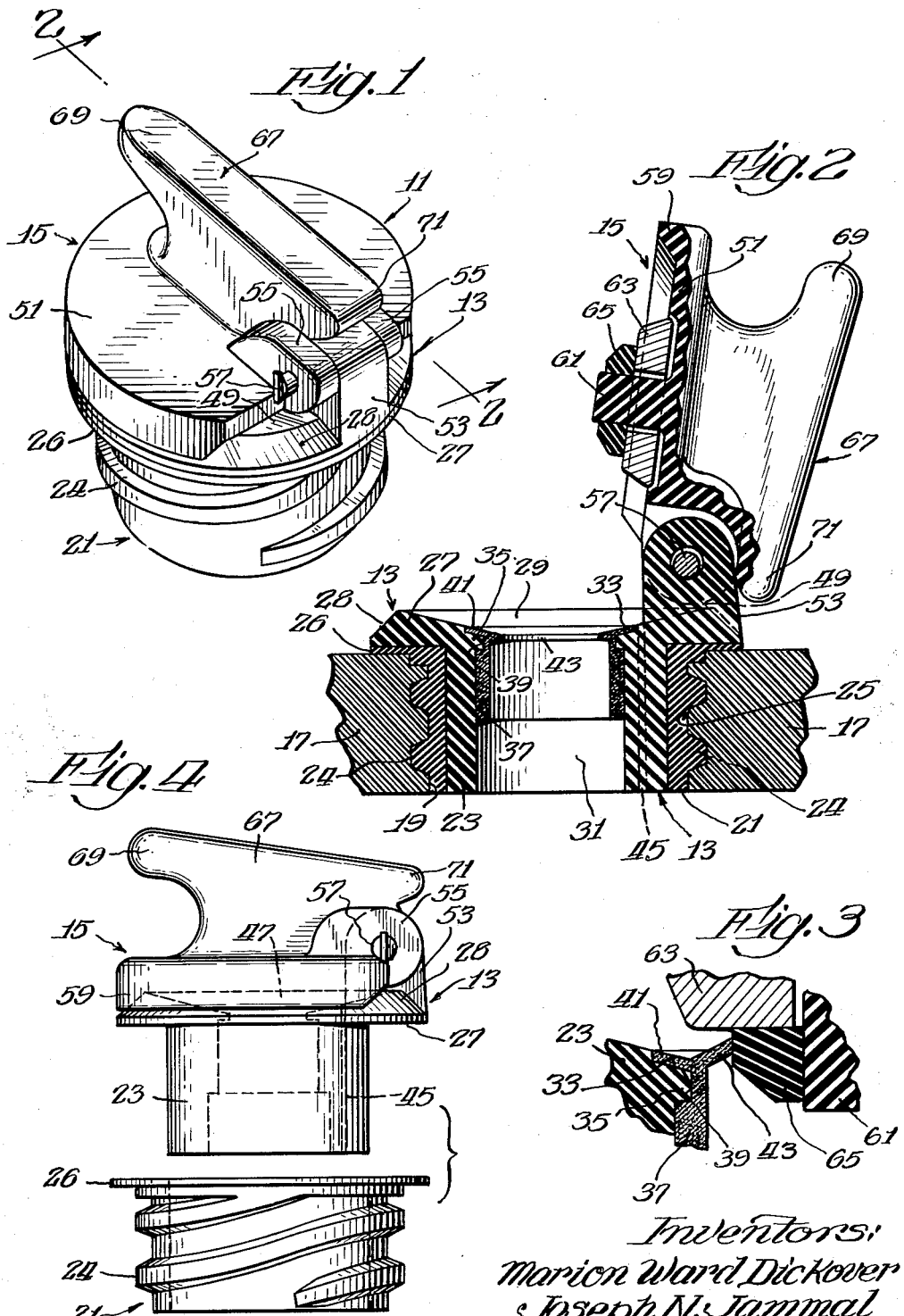

3,216,865
BATTERY VENT CLOSURE
Marion Ward Dickover, Glenview, Ill., and Joseph N. Jammal, Ashtabula, Ohio, assignors to KW Battery Company, Skokie, Ill.
Filed Feb. 7, 1962, Ser. No. 171,718
1 Claim. (Cl. 136—177)

This application is a continuation-in-part of application Serial No. 41,568 filed July 8, 1960, now Patent No. 3,098,773.

This invention relates to self-sealing closures for storage battery service openings and, in particular, to means for securing such a closure to a wall of a storage battery casing.

Storage batteries such as are used in various mobile units, conventionally include a service opening in the battery casing and a closure mounted on the casing to cover the service opening when the battery is in use. The closures generally include a base portion mounted on the wall of the battery casing adjacent the service opening and a lid hingedly mounted on the base for movement between an open and a closed position. Occasionally the closures have included provision for the self-closing of the lid.

The conventional method of securing the closure to the battery casing has been by means of a threaded plug which projects downwardly from the base and extends into the service opening. The threads of the plug engage mating threads on the wall of the opening, the interengagement of the threads thus serving to maintain the closure in place.

Customarily, both the closure and the casing are formed of a corrosion-resistant hard rubber which does not lend itself well to the accurate machining of threads. Accordingly, it is difficult to obtain a snug fit between the closure plug and casing and, when the battery is utilized in mobile units, and is hence subjected to joggling and vibration, the closure frequently becomes loosened to a point wherein it fails to provide a satisfactory seal for the service opening. Occasionally, if the loosened condition is not promptly discovered the closure is lost.

The principal object of the present invention is to provide an improved battery closure of the type generally available.

An additional object of the invention is to provide a battery closure which has improved self-closing features and improved sealing means which also maintains the lid in a closed position.

A further object of the invention is to provide an improved retaining means for securing the plug of such a closure within the service opening of a battery, which retaining means prevents the closure from becoming loosened by normal vibrations or joggling of the battery.

A still further object of the invention is to provide a deformable sleeve for the closure plug, which sleeve will intimately engage the wall of the service opening and thereby prevent accidental loosening of the closure.

Other objects and advantages of the invention will become apparent with reference to the following description and accompanying drawings.

In the drawings:

FIGURE 1 is a perspective view of a closure formed in accordance with the present invention and provided with an improved retaining sleeve;

FIGURE 2 is a sectional view taken along line 2—2 of FIGURE 1, but showing the closure secured within the service opening of a battery casing;

FIGURE 3 is an enlarged detailed sectional view of the closure of FIGURE 1 showing the cooperation between certain elements as the lid is closed; and FIGURE 4 is an elevational view of the closure and retaining sleeve shown in FIGURE 1, but in exploded relation to each other.

Very generally, the present invention, as shown in the illustrated embodiment, comprises a closure 11 having a base 13 on which a lid 15 is mounted for hinged movement between an open and a closed position. The closure 11 is adapted to be secured to a battery casing wall 17 adjacent a service opening 19 therein by a retaining sleeve 21 which is effective to maintain the closure securely in place and to prevent accidental loosening thereof.

More specifically, the base 13 is preferably formed of a corrosion resistant material such as hard rubber and includes a cylindrical plug 23 adapted to fit within the service opening 19 of the casing 17. The plug 23 is of a diameter somewhat less than that of the service opening, thus providing a space for the retaining sleeve 21 intermediate the wall of the plug and the wall of the opening.

The closure 11 is maintained in place on the casing wall 17 by means of interengaging sets of screw threads, one of which projects outwardly from the outer wall of the plug 23 and the other of which projects inwardly from the wall of the service opening 19. In accordance with the present invention, the threads of one set are of a deformable material such as soft rubber and are so proportioned, as for example by being oversize or of an irregular shape relative to the shape of the mating set, that they will be deformed upon engagement with the mating set and thereby retain the plug securely in place.

In the illustrated embodiment, deformable threads 24 are provided on the outer wall of the plug 23 by the retaining sleeve 21 which is formed of a flexible material such as soft rubber and bonded to the outer wall of the plug. The threads 24 engage and are deformed by mating threads 25 on the wall of the service opening 19 when the plug and sleeve are screwed into place within the opening.

The sleeve 21 is of a tubular shape and, in addition to the threads 24, has projecting from the outer wall thereof a thin flexible flange 26 which defines the upper end of the sleeve. When the closure is secured in place on the casing, as shown in FIGURE 2 of the drawing, the flange 26 of the sleeve 21 lies intermediate the upper surface of the casing wall 17 and the lower surface of the flange 27 of the closure base 13 and provides a seal therebetween.

It will be seen therefore that the retaining sleeve 21 fixes the plug 23 of the closure 11 securely in place within the service opening 19 and, after the plug has been so placed, the closure will not accidentally become loosened incident to vibrations or joggling of the battery. The sleeve 21 is economical to manufacture and can be secured to the plug of the closure or the wall of the service opening by a simple bonding operation.

By way of example, an embodiment of the invention is provided in which a closure formed of a rubber having a hardness of from about 55 to 75 Durometer shore type D, is utilized. A soft rubber sleeve having a hardness of from about 60 to 80 Durometer shore type A is bonded to the plug of the closure by means of epoxy cement.

Extending radially outwardly from the side wall of the plug 23 adjacent its upper end is the flange 27 provided with an outwardly and downwardly beveled rim 28 which cooperates with a beveled portion of the lid 13 (yet to be described) to insure a close fit between the base and lid. A conical section 29 extends inwardly and downwardly from the rim 27.

The battery is serviced through a main service passageway 31 which extends vertically through the base 13 axially of the plug 23 and which is provided at its upper end with an annular recess 33. An interlocking ledge in the form of rib 35 extends into the passageway 31 adjacent the recess 33 and is adapted to position and hold a soft rubber bushing 37 within the passageway.

The bushing 37 provides a seal between the lid 15 and base 13 and includes a circular groove 39 in its outer surface to receive the rib 35. The interengagement of the rib 35 and the groove 39 serves as the means whereby the bushing 37 is maintained within the passageway 31 and, because of the flexibility of the bushing, it can be readily disengaged from the rib 29 and replaced should it become worn.

The upper edge of the bushing 37 is provided with a pliable, radially-directed flange 41 which occupies the annular recess 33 of the base 13 and extends into the main service passageway 31 to form an outwarly projecting lip 43. Cooperation between the lip 43 and a portion of the lid 15 serves to maintain the lid in the closed position and also povides a seal. This important feature of the invention will be more particularly described hereinafter.

The base 13 also includes a breather duct 45, shown best in FIGURES 2 and 4, to provide a vent for the gases which are generated by the action of the battery during charging or evaporation. The breather duct extends from the conical section 29 of the base to a portion of the lower surface of the plug 23 to provide communication between the interior and exterior of the battery. Gases passing through the duct 45 enter a chamber 47 defined by the conical section 29 of the base and the lid 15 when the lid is closed. The gases subsequently leave the chamber 47 through the rear portion of the closure 11 by means of an outlet 49. The conical shape of the section 29 will cause any liquid which may be spilled or splashed onto the section to flow down and to the flange 41, over the lip 43 and into the battery.

It may be noted at this time that in the illustrated embodiment, the breather duct 45 is covered by the lid 15 in such a manner that the duct will not be blocked or filled with falling material or debris. It is desirable to provide this protection for the upper end of the duct since such materials would have a tendency to plug this opening and interfere with the proper functioning of the battery. The chamber 47 and outlet 49 provide for the escape of gases without danger of the plugging of the duct or outlet.

The lid 15 comprises a flat plate 51 pivotally mounted on the base 13 by means of a hinge support 53 which projects upwardly from the upper surface of the base and is disposed intermediate a pair of spaced ears 55 projecting outwardly from the rearward portion of the plate 51. A hinge pin 57 passes through the hinge support 53 and ears 55 and defines the axis about which the lid pivots. A rim flange 59 generally surrounds the circular portion of the plate 51 and extends downwardly toward the base when the lid is in the closed position. The inner surface of the flange 59 is beveled so that it fits onto the beveled rim 27 of the base, as previously mentioned, to provide an intimately fitting lid.

The lid 13 is also provided with a post 61 which extends from the inner surface of the lid and which has its axis aligned with the axis of the main service passageway 31 when the lid is in the closed position. A lead washer 63 encircles the post 61 and locates the center of gravity of the lid slightly inwardly toward the axis of the service passageway 31 when the lid is in the raised position and tends to cause the lid to close easily by joggling of the battery. A second washer 65, preferably of rubber, is snugly fitted onto the post 61 and holds the lead washer 63 in place. When the lid is closed, the rubber washer 65 and post 61 fit into and seal the opening defined by the lip 43 of the bushing 37, and the lead washer 63 overlies the lip and prevents it from flexing.

It will be noted from the drawings that the pivotal axis of the lid 15, as defined by the the hinge pin 57, is located above the plane defined by the lip 43 of the bushing 37. Because of the positioning of these elements, when the lid is first opened, the rubber washer 65 rotates with the lid about the hinge pin 57 causing the lip 43 of the bushing to flex (FIGURE 3). The lip thus serves to maintain the lid 15 in a closed condition, but does not make it necessary to fasten and unfasten the lid prior to raising it for servicing of the battery. If it were not for this feature, the lid would bounce open during a joggling of the battery and create a possibility of the electrolyte splashing out through the service opening.

In addition, the relative diameters of the washer 65 and the opening defined by the lip 43 are such that an effective seal is provided when the lid is in the closed position.

The lid 15 also includes a grip or handle 67 having a forwardly extending arm 69 to facilitate opening and closing and rearwardly extending arm 71 positioned to abut the rearward surface of the hinge support 53 of the base when the lid is opened. While in the illustrated embodiment, it is the cooperation of the rearward arm 71 of the handle 67 and the rearward edge of the hinge support 53 which determines the angle at which the lid will be supported when it is in the open position, other means may be provided on the lid 15 and base 13 to serve this function. It has been found that an angle of 5 degrees past the vertical, or an outer opening angle of approximately 95 degrees for a horizontally disposed base, is satisfactory for this construction.

In the use of the improved battery closure, the workman opens the lid 15 to test or fill the battery. If he leaves the lid open, normally the electrolyte of the battery will be lost by excessive evaporation and splashing. However, in most uses of such batteries the battery is subjected to vibration and the lid of the battery closure will close. As the lid falls or is closed, the plug formed by the post 61 and washer 65 will fit within the opening defined by the lip 43 of the bushing 37. When the lid is closed, the location of the hinge pin 57 is such that the cooperation of the plug and the lip 43 will prevent the lid from opening in normal operation, and will provide an effective seal for the service opening.

Although certain specific embodiments of the invention are shown and described, it will be understood that the details of the construction shown may be altered without departing from the scope of the invention as defined by the following claim:

What is claimed is:

In combination, a battery casing wall containing a threaded service opening, a closure for said opening including a base having an upper flange portion and having a depending plug portion extending into said service opening and also having a passageway extending through said base and said plug portion and being in communication with the interior of the battery, said passageway being provided with an inwardly extending pliable lip adjacent its upper end, a lid hingedly mounted on said base and provided with a downwardly extending portion coaxial with said passageway when said lid is in the closed position and adapted to cooperate with said lip to provide a seal, and a flexible tubular sleeve bonded to said plug portion, said sleeve being formed of a material having a hardness substantially less than that of said base and said battery casing, and said sleeve having a radially directed flange at the uppermost end thereof which radial flange lies intermediate the outer surface of said casing wall and said upper flange portion of said base and provides a seal therebetween, the outer surface of said sleeve having deformable threads thereon which mate with the threads of said service opening to secure said closure in said service opening, said deformable threads being so proportioned that they are deformed by engagement with the threads of said service opening thereby providing a tight fit therebetween.

References Cited by the Examiner
UNITED STATES PATENTS

| | | | |
|---|---|---|---|
| 589,505 | 9/97 | Johnson | 215—49 |
| 2,491,162 | 12/49 | Christen | 136—177 |
| 2,506,952 | 5/50 | Doughty | 136—177 |

JOHN H. MACK, *Primary Examiner.*